(12) United States Patent
Wang et al.

(10) Patent No.: US 6,366,452 B1
(45) Date of Patent: Apr. 2, 2002

(54) FLAT DISPLAY WITH A REPLACEABLE BASE STAND

(75) Inventors: Chien-Jui Wang, Hsin-Chu; Chang-I Tseng, San-Chung; Yung-Chuan Ma, Kao-Hsiung Hsien; Chia-Chuan Lin, Pan-Chiao, all of (TW)

(73) Assignee: Acer Incorporated, Hsichih (TW)

( * ) Notice: Subject to any disclaimer, the term of this patent is extended or adjusted under 35 U.S.C. 154(b) by 0 days.

(21) Appl. No.: 09/576,138

(22) Filed: May 22, 2000

(30) Foreign Application Priority Data

Feb. 24, 2000 (TW) ........................................ 89103215 A

(51) Int. Cl.$^7$ ................................................. G06F 1/16
(52) U.S. Cl. ..................... 361/681; 361/679; 361/681; 361/682; 361/683; 361/686; 361/727; 361/875; 248/917; 248/918; 248/920; 248/921; 248/922; 248/923; 248/125.1; 248/223.1; 248/223.3; 248/223.6; 248/223.41; 248/225.1; 248/230; 248/283.1; 248/442.2; 248/458; 52/36.4
(58) Field of Search ................................ 361/679, 681, 361/683, 686, 727, 825; 248/917, 918, 920–923, 125.1, 223.1, 223.3, 223.6, 230, 223.41, 225.11, 283.1, 442.2, 458; 52/36.4

(56) References Cited

U.S. PATENT DOCUMENTS 5,537,290 A * 7/1996 Brown et al. ................ 361/681
6,134,103 A * 10/2000 Ghanma ...................... 361/681

* cited by examiner

Primary Examiner—Leo P. Picard
Assistant Examiner—Yean Hsi Chang
(74) Attorney, Agent, or Firm—Winston Hsu

(57) ABSTRACT

The present invention provides a flat display with replaceable base stand. The flat display has a flat display panel for displaying an image frame, a support pedestal rotatably installed on the back of the flat display panel, and a base stand comprising an opening which can accommodate the support pedestal. The support pedestal has a protruding portion installed on the back of the flat display panel and a fixture rotatably installed on the protruding portion. The fixture fits inside the opening of the base stand to rotatably install the flat display panel onto the base stand.

7 Claims, 4 Drawing Sheets

FLAT DISPLAY WITH A REPLACEABLE BASE STAND

BACKGROUND OF THE INVENTION

1. Field of the Invention

The present invention relates to a flat display, and more particularly, to a flat display with a replaceable base stand.

2. Description of the Prior Art

For information processing apparatuses, a display is used to display the information that is being processed, such as text or image information. With the advances in technology, the current display is a flat panel display, instead of an outdated cathode ray tube (CRT). Such displays are more compact, and also emit less radiation than their predecessors. The most popular flat display for information processing apparatuses is a liquid crystal display (LCD).

An all-in-one LCD-PC is made by assembling a flat display and a host computer inside a housing. Such a device is both compact and relatively easy to use. The flat display is more expensive than the host computer, but it has a longer useful life. However, when part of the host computer needs to be upgraded or goes out of use, the flat display, though still in good condition, is thrown away with the host computer. This is wasteful of both resources and money. Conversely, a variety of information apparatuses need to display image information, such as personal computers, video recorders, televisions, game consoles, etc. Hence, a typical family might possess a plurality of redundant displays, which is also wasteful. Additionally, if the host computer is in need of repair, the display can be scraped or otherwise damaged while servicing, which aggravates repair costs.

SUMMARY OF THE INVENTION

It is therefore a primary objective of the present invention to provide a flat display with a replaceable base stand to solve the above-mentioned problems.

In a preferred embodiment, the present invention provides a flat display which comprises a flat display panel for displaying an image frame, a support pedestal rotatably installed on the back of the flat display panel, and a base stand comprising an opening which can accommodate the support pedestal. The support pedestal fits inside the opening of the base stand so as to rotatably install the flat display panel onto the base stand.

It is an advantage of the present invention that the flat display has a modular design that enables flat panel displays to be easily assembled and disassembled, thereby enabling an easy way to swap or replace such displays. Furthermore, such a design simplifies repair procedures, and so avoids damage to other components.

These and other objectives of the present invention will no doubt become obvious to those of ordinary skill in the art after having read the following detailed description of the preferred embodiment, which is illustrated in the various figures and drawings.

DETAILED DESCRIPTION OF THE PREFERRED EMBODIMENT

Figure 1:
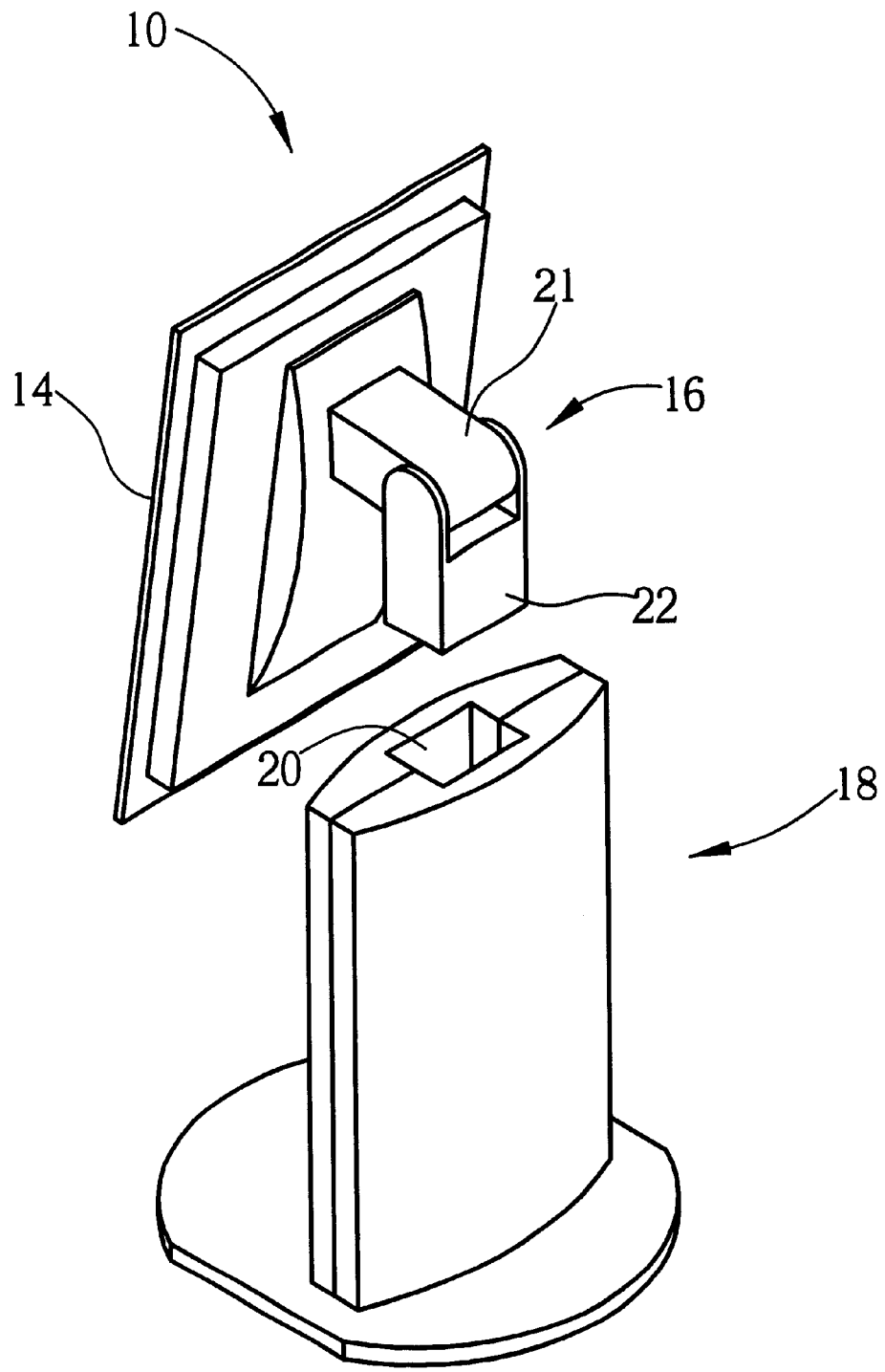
FIG. 1 is a perspective diagram of a flat display according to the first embodiment of the present invention.

Please refer to FIG. 1. FIG. 1 is a perspective diagram of a flat display 10 according to the first embodiment of the present invention. The present invention provides the flat display 10 with a replaceable base stand. The flat display 10 comprises a flat display panel 14, a support pedestal 16 rotatably installed on the back of the flat display panel 14, and a base stand 18 which has a vertically aligned opening 20. The flat display panel 14 is used to translate image signals into an image frame and display the image frame. The opening 20 of the base stand 18 accommodates the support pedestal 16.

The support pedestal 16 comprises a protruding portion 21 installed on the back of the flat display panel 14, and a fixture 22 rotatably installed on the protruding portion 21. The fixture 22 can be vertically downwardly placed inside the opening 20 of the base stand 18 to rotatably install the flat display panel 14 onto the base stand 18. The fixture 22 of the support pedestal 16 has a rectangular cross section, and the opening 20 of the base stand 18 is a rectangular opening that corresponds to the cross section of the fixture 22. The opening 20 accommodates the fixture 22 so that the flat display panel 14 is stably installed on the base stand 18. The support pedestal 16 fits inside the opening 20 of the base stand 18 so as to rotatably install the flat display panel 14 on the base stand 18. The support pedestal 16 can be upwardly pulled out from the opening 20, easing the disassembly of the flat display panel 14 and the base stand 18. With the flat display panel 14 rotatably installed on the base stand 18, the user can adjust the angle of the flat display panel 14 with a clockwise or anticlockwise rotation.

Figure 2:
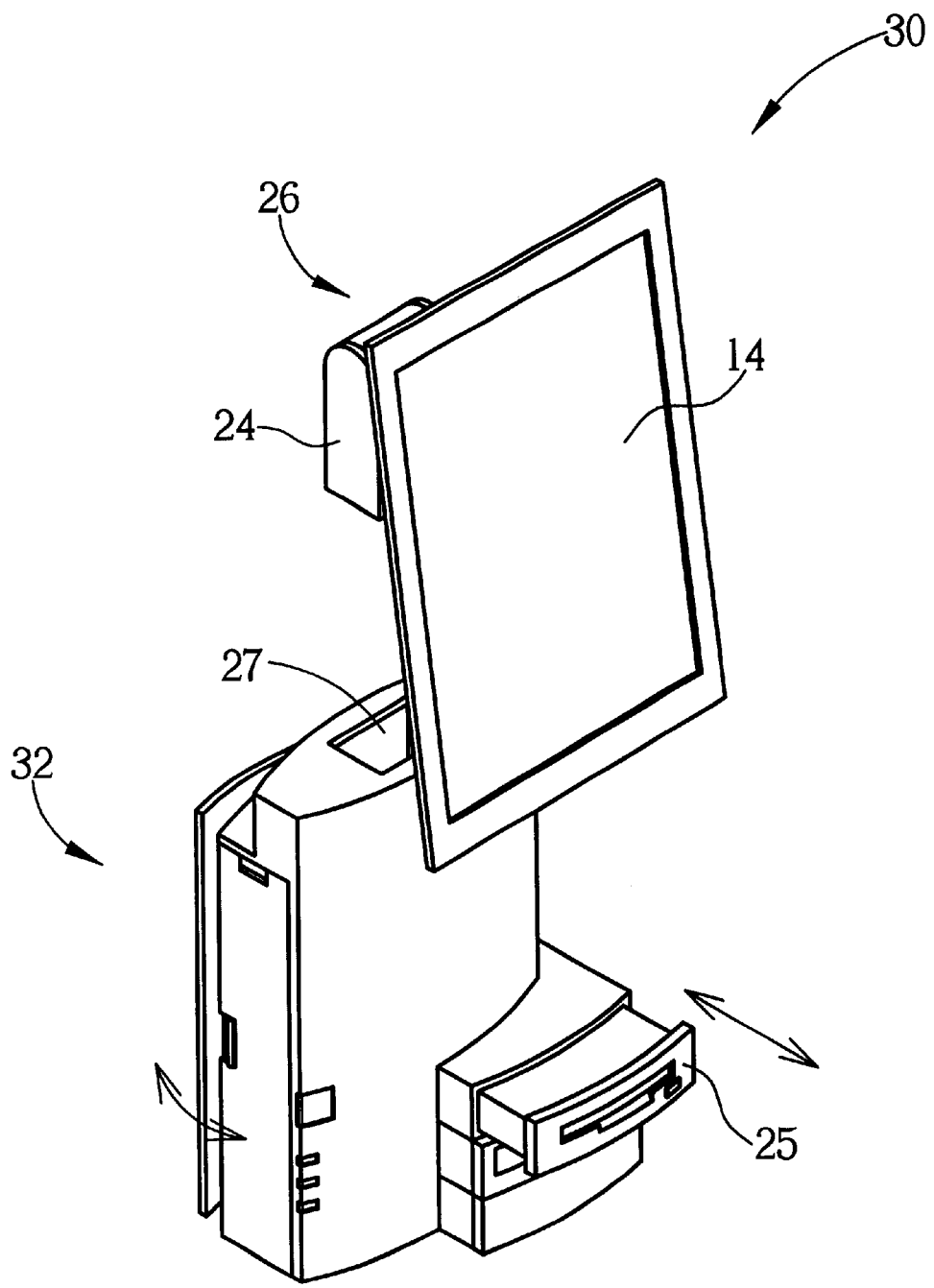
FIG. 2 is a perspective diagram of a flat display according to the second embodiment of the present invention.

Please refer to FIG. 2. FIG. 2 is a perspective diagram of a flat display 30 according to the second embodiment of the present invention. The second embodiment of the present invention provides a flat display 30 whose base stand 32 is a host computer. The host computer 32 comprises a plurality of storage units 25 for reading and writing external data. The fixture 24 of the support pedestal 26 comprises a plurality of power supply pins (not shown) and a plurality of signal pins (not shown). The opening 27 of the host computer 32 comprises a plurality of power supply pins (not shown) corresponding to those of the fixture 24, and a plurality of signal pins (not shown) that correspond to those of the fixture 24. When the support pedestal 26 is placed inside the opening 27 of the host computer 32, the power supply pins of the fixture 24 and the power supply pins of the opening 27 are connected to supply power from the host computer 32 to the flat display panel 14. Similarly, the signal pins of the fixture 24 and the signal pins of the opening 27 are connected to enable the host computer 32 to transmit image signals to the flat display panel 14. The flat display panel 14 further comprises a power line (not shown) that can also connect to an external power supply for providing power to the flat display panel 14. This extra power line is provided in the event that the fixture 24 has only the signal pins and the opening 27 has only the signal pins that correspond to those of the fixture 24.

Figure 3:
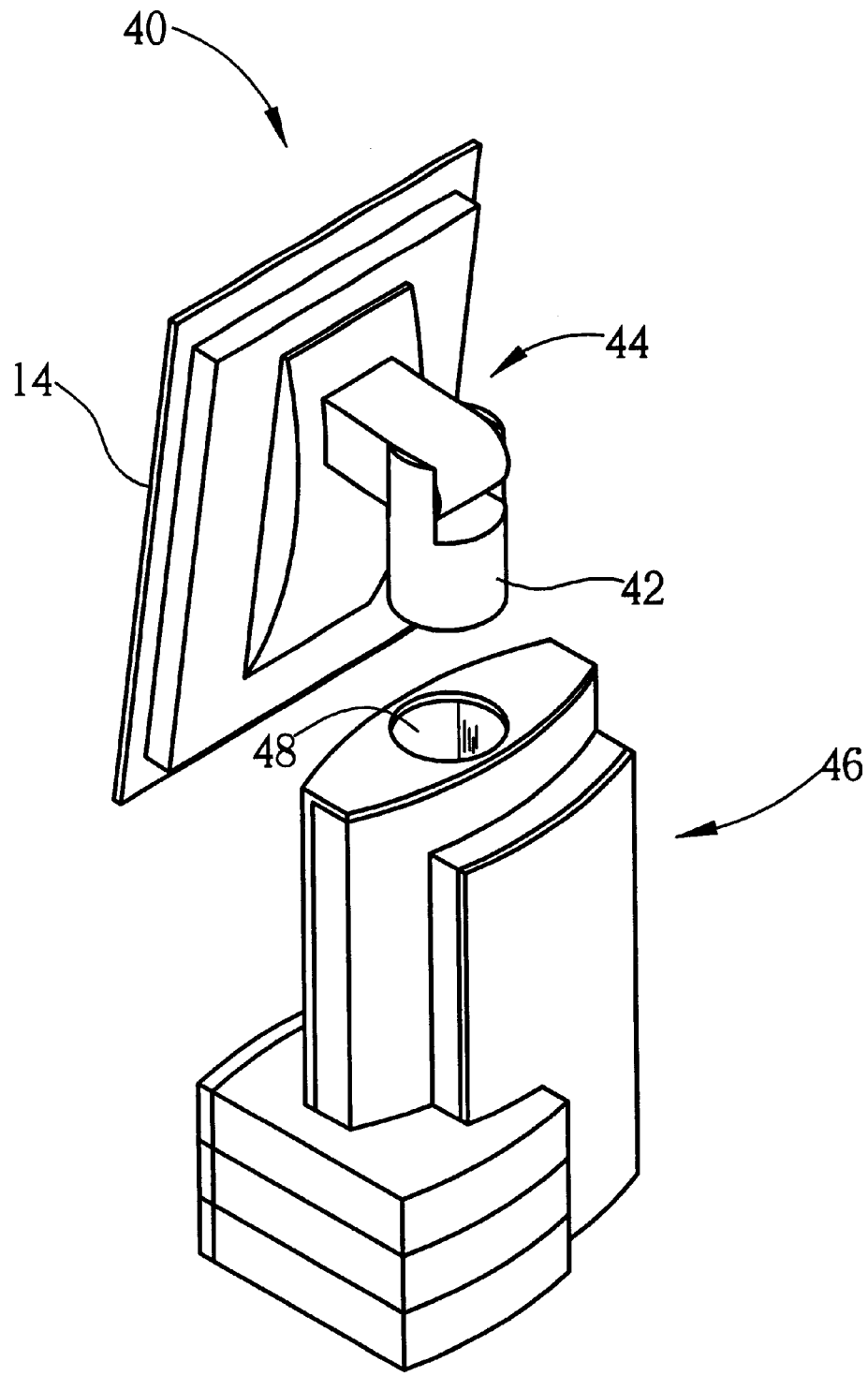
FIG. 3 is a perspective diagram of a flat display according to the third embodiment of the present invention.

Please refer to FIG. 3. FIG. 3 is a perspective diagram of a flat display 40 according to the third embodiment of the present invention. The third embodiment of the present invention provides a flat display 40 with a support pedestal 44 whose fixture 42 has a cylindrical cross section. An opening 48 of a base stand 46 is a cylindrical opening that corresponds to the cross section of the fixture 42 for accommodating the fixture 42 and permitting the flat display 40 installed on the base stand 42 to rotate left and right. The user can also adjust the angle of the flat display panel 14 with a clockwise or an anti-clockwise rotation.

Figure 4:
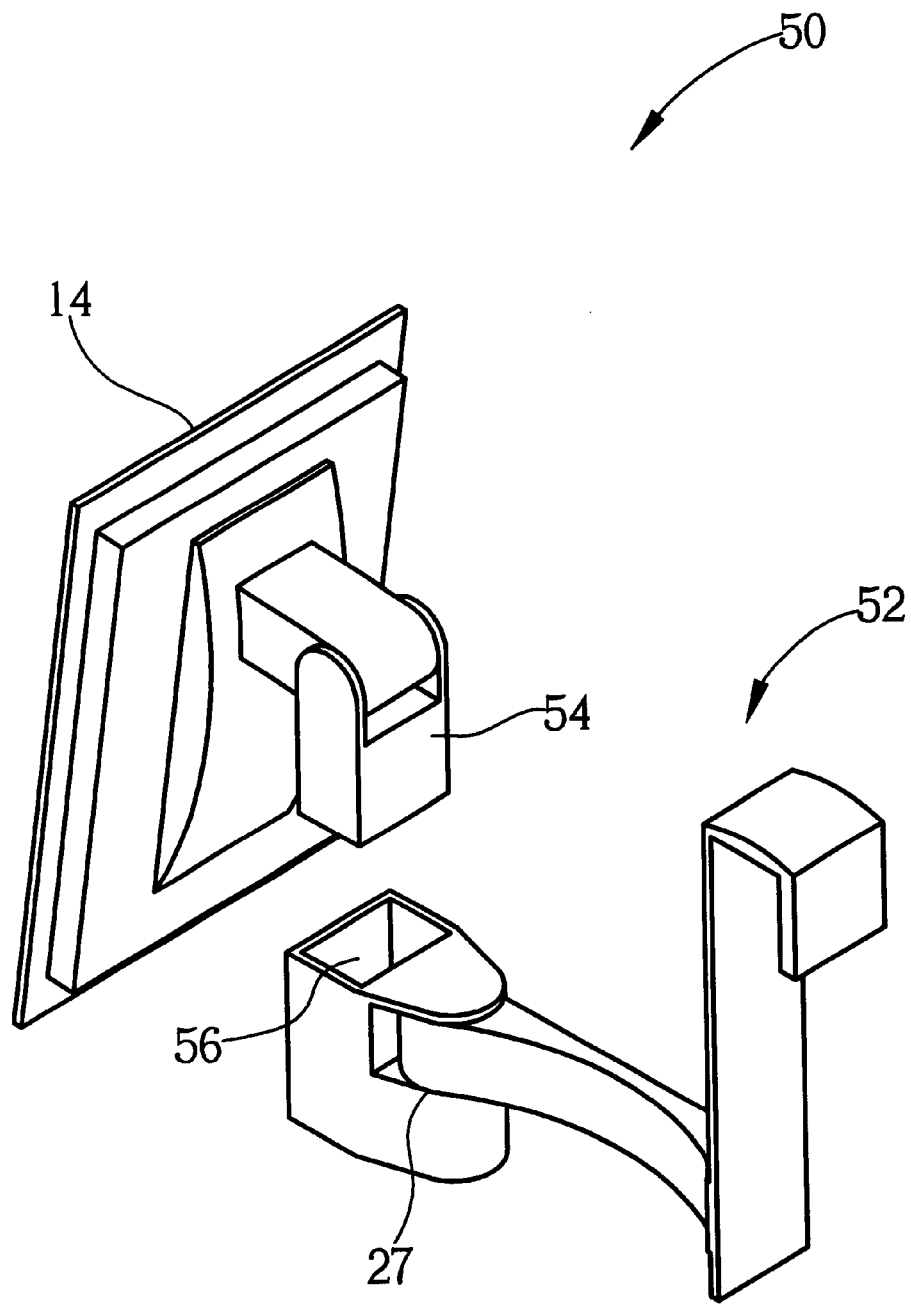
FIG. 4 is a perspective diagram of a flat display according to the fourth embodiment of the present invention.

Please refer to FIG. 4. FIG. 4 is a perspective diagram of a flat display 50 according to the fourth embodiment of the present invention. The fourth embodiment of the present invention provides a flat display 50 whose base stand 52 is a cantilever. The cantilever 52 further comprises a rotor 27 for rotating the flat panel display 14 left or right. After the support pedestal 54 is downwardly fitted inside an opening 56 of the cantilever 52, the user can secure the cantilever 52 onto a wall, or some other such structure.

The flat display of the present invention has a modular design. The flat display can fit into different base stands and peripheral devices, permitting it to be used as a display for a variety of information apparatuses, such as personal computers, video recorders, televisions, TV game consoles, etc. Also, the flat display can be fitted onto host computers and storage units to become an all-in-one computer with the flat display. Consequently, the flat display provides a multitude of assembly options. This permits greater financial efficiency for each independent device, and aids repairing procedures when servicing.

Compared to the prior art of the flat display, the flat display of the present invention has a modular design. Such a design enables the flat display to be used with various host computers and storage units for continuing product use, increasing the applied range of use.

The flat panel display has an interchangeable assembly. The flat display, the host computer and the storage unit are each modular units, wherein the flat display is a 15-inch or 17-inch LCD, the host computer is chosen according to style and functionality, and the storage unit could be a CD-ROM, CD-R/W, DVD, etc. Each component of the system can be easily replaced and changed.

Such a modular design is very economical. If one component breaks, it is no longer necessary to throw the remaining, usable, equipment away. For example, if the host computer no longer functions, the flat display can be saved for use with other host computers.

The modular design eases the servicing of other components. For example, if the host computer is broken, the flat display can be separated from the host computer prior to repairing the host computer. This ensures that the flat display will not be damaged while the host computer is being repaired.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A computer system comprising:

a flat display panel for displaying an image frame;

a support pedestal comprising a protruding portion rotatably installed on the back of the flat display panel and a fixture rotatably installed on the protruding portion, the fixture having a circular cross section; and a base stand having a host computer in it with at least one storage unit and comprising a cylindrical opening corresponding to the circular cross section of the fixture on an upper end of the base stand for accommodating the fixture of the support pedestal;

wherein the fixture of the support pedestal can be removably connected into the cylindrical opening of the base stand along a vertical axis so that the flat display panel can rotate about the vertical axis relative to the base stand.

2. The computer system of claim 1 wherein the storage unit can be a CD-ROM or DVD device.

3. The computer system of claim 1 wherein the fixture comprises a plurality of signal pins or power supply pins, and the opening of the base stand also comprises a plurality of corresponding signal pins or power supply pins wherein when the support pedestal is removably connected to the opening of the base stand, the signal pins or power supply pins of the fixture will be connected to the corresponding signal pins or power supply pins of the base stand so as to enable the host computer inside the base stand to transmit image signals or electric power to the flat display panel.

4. An information apparatus comprising:

a flat display comprising a flat display panel for displaying an image frame, and a support pedestal having a protruding portion rotatably installed on the back of the flat display panel, and a cylindrical fixture rotatably installed on the protruding portion; and a host computer installed in a base stand with at least one storage unit in it, the host computer being used for processing data, the base stand comprising a cylindrical opening corresponding to the cylindrical fixture on an upper end of the base stand for accommodating the fixture of the support pedestal;

wherein the fixture of the support pedestal can be removably connected into the cylindrical opening of the base stand along a vertical axis so that the flat panel display can rotate about the vertical axis relative to the base stand.

5. The information apparatus of claim 4 wherein the host computer is a personal computer.

6. The information apparatus of claim 4 wherein the storage unit can be a CD-ROM or DVD device.

7. The information apparatus of claim 4 wherein the fixture comprises a plurality of signal pins or power supply pins, and the opening of the base stand also comprises a plurality of corresponding signal pins or power supply pins wherein when the support pedestal is removably connected to the opening of the base stand, the signal pins or power supply pins of the fixture will be connected to the corresponding signal pins or power supply pins of the base stand so as to enable the host computer inside the base stand to transmit image signals or electric power to the flat display panel.

* * * * *